US010052935B2

(12) United States Patent
Dickow et al.

(10) Patent No.: US 10,052,935 B2
(45) Date of Patent: Aug. 21, 2018

(54) FEATURE DESCRIPTION DATA FOR VEHICLE ZONE CONFIGURATION

(71) Applicant: MYINE ELECTRONICS, INC., Ferndale, MI (US)

(72) Inventors: Justin Dickow, Royal Oak, MI (US); Joey Ray Grover, Madison Heights, MI (US); Omar Makke, Lyon Township, MI (US); John Byrne, Detroit, MI (US)

(73) Assignee: Livio, Inc., Royal Oak, MI (US)

( * ) Notice: Subject to any disclaimer, the term of this patent is extended or adjusted under 35 U.S.C. 154(b) by 73 days.

(21) Appl. No.: 15/001,844

(22) Filed: Jan. 20, 2016

(65) Prior Publication Data
US 2017/0203634 A1 Jul. 20, 2017

(51) Int. Cl.
*B60W 10/30* (2006.01)
*B60H 1/00* (2006.01)
*G08G 1/0967* (2006.01)

(52) U.S. Cl.
CPC ....... *B60H 1/00742* (2013.01); *G08G 1/0967* (2013.01)

(58) Field of Classification Search
CPC .................. B60H 1/00742; B60W 50/0098
USPC .......................................................... 701/36
See application file for complete search history.

(56) References Cited

U.S. PATENT DOCUMENTS

| 8,866,604 | B2 | 10/2014 | Rankin et al. | |
|---|---|---|---|---|
| 8,948,790 | B1 | 2/2015 | Kim et al. | |
| 2004/0034455 | A1 | 2/2004 | Simonds et al. | |
| 2015/0149042 | A1* | 5/2015 | Cooper | B60R 16/037 701/48 |
| 2015/0210287 | A1* | 7/2015 | Penilla | B60W 40/08 701/49 |
| 2015/0256669 | A1* | 9/2015 | James | H04M 1/72577 455/418 |
| 2016/0142877 | A1* | 5/2016 | Gujral | H04W 4/046 455/456.1 |

(Continued)

OTHER PUBLICATIONS

Isenberg, APIs: The Vehicle Module, Oct. 29, 2012, Webinos Consortium (http://dev.webinos.org/deliverables/wp3/Deliverable32/static$d2d61fb34ef61308b820984c4bc8853d.html).*

(Continued)

*Primary Examiner* — Nadeem N Odeh
(74) *Attorney, Agent, or Firm* — Jennifer M. Stec; Brooks Kushman P.C.

(57) ABSTRACT

Wireless sensors are included within zones of a physical space. A memory stores feature description data. A processor, in communication with the memory and the wireless sensors, is programmed to send, to a mobile device connected to one of the wireless sensors, a subset of the feature description data applicable to one of the zones in which the mobile device is located. The processor also is programmed to receive a request to update a feature of the one of the zones based on the feature description data, and apply the setting update when the mobile device has permission. The zones of a physical space may be seating zones of a vehicle, and the wireless sensors may be included within doors to the seating zones of the vehicle. The mobile device may determine a seating zone of the vehicle in which the mobile device is located using the wireless sensors.

17 Claims, 9 Drawing Sheets

(56) References Cited

U.S. PATENT DOCUMENTS

2017/0118321 A1* 4/2017 Buttolo ............... H04M 1/6091

OTHER PUBLICATIONS

Anonymous, Method to Store and Apply Driver Preferences with Mobile Device, Nov. 18, 2013, IP.com Prior Art Database Technical Disclosure.*
Rees, Kevron et al. (Editor), "Vehicle Information Access API, Final Business Group Report, Nov. 24, 2014," 8 pages, retrieved Jul. 7, 2015 from http://www.w3.org/2014/automotive/vehicle_spec.html.
"[vehicle_spec] #7 ZoneInterface—add enumerations to ZonePosition for vertical axis #40," 4 pages, retrieved Jul. 7, 2015 from https://github.com/w3c/automotive/issues/40.

* cited by examiner

FEATURE DESCRIPTION DATA FOR VEHICLE ZONE CONFIGURATION

TECHNICAL FIELD

Aspects of the disclosure generally relate to feature description data enumerating vehicle functionality within seating zones of the vehicle.

BACKGROUND

Sales of mobile devices, such as smartphones and wearables, continue to increase. Thus, more mobile devices are brought by users into the automotive context. Smartphones can already be used in some vehicle models to access a wide range of vehicle information, to start the vehicle, and to open windows and doors. Some wearables are capable of providing real-time navigation information to the driver. Device manufacturers are implementing frameworks to enable a more seamless integration of their brand of mobile devices into the driving experience.

SUMMARY

In a first illustrative embodiment, a system includes a mobile device including a wireless transceiver; and a processor programmed to determine a seating zone of a vehicle in which a user of the mobile device is located using the wireless transceiver and wireless sensors of the vehicle, receive feature description data enumerating features applicable to the seating zone from one of the wireless sensors located in the seating zone, and adjust the applicable features in accordance with user settings.

In a second illustrative embodiment, a system includes wireless sensors included within zones of a physical space; memory storing feature description data; and a processor, in communication with the memory and the wireless sensors, programmed to send, to a mobile device connected to one of the wireless sensors, a subset of the feature description data applicable to one of the zones in which the mobile device is located, receive a request to update a feature of the one of the zones based on the feature description data, and apply the update to the feature if the mobile device has permission to update the features.

In a third illustrative embodiment, a method includes determining a seating zone of a vehicle in which a mobile device is located using signal strength data received from wireless sensors of the vehicle; receiving, from one of the wireless sensors located in the seating zone, feature description data enumerating vehicle features of the seating zone; and adjusting the features in accordance with user settings stored to the mobile device specifying feature preferences.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

A vehicle interior may include features having user-configurable settings. These features may include, as some examples, infotainment, climate, and power or heated/cooled seats. A component interface application installed to a mobile device may apply user settings stored to the mobile device for automatic configuration of the vehicle features. In an example, the component interface application may send commands to a head unit of the vehicle requesting settings changes, and the head unit may process the commands to provide the desired response.

The vehicle interior may be divided into multiple zones, where each zone may be associated with a seating position within the vehicle interior. Each of the various features present in the vehicle interior may be associated with the one or more of the zones. As some examples, a feature may be associated with the zone in which the respective feature is located and/or the one (or more) of the zones that is controlled by the respective feature.

To provide for remote control of the vehicle features, the component interface application may request the vehicle for feature description data defining available features of the user's zone. The feature description data may be persisted on the vehicle and provided to the component interface application for use.

The feature description data may provide a concise representation for the description and control of component functionality. For each component, the feature description data specifies a type of feature, in which zone or zones of the vehicle the feature is located (or where controls for the feature are located), and which zone or zones of the vehicle are affected by the functionality of the feature. The feature description data may be used by the component interface application to determine what functionality is available for control in the seating zone in which the user is located. In an example, the component interface application may compare the available features to user settings stored to the mobile device. For those features that have associated user settings, the component interface application may send one or more requests to the vehicle to configure the functions available in the seating zone in accordance with the user settings. Further aspects of the feature description data and its use are described in detail below.

Figure 1:
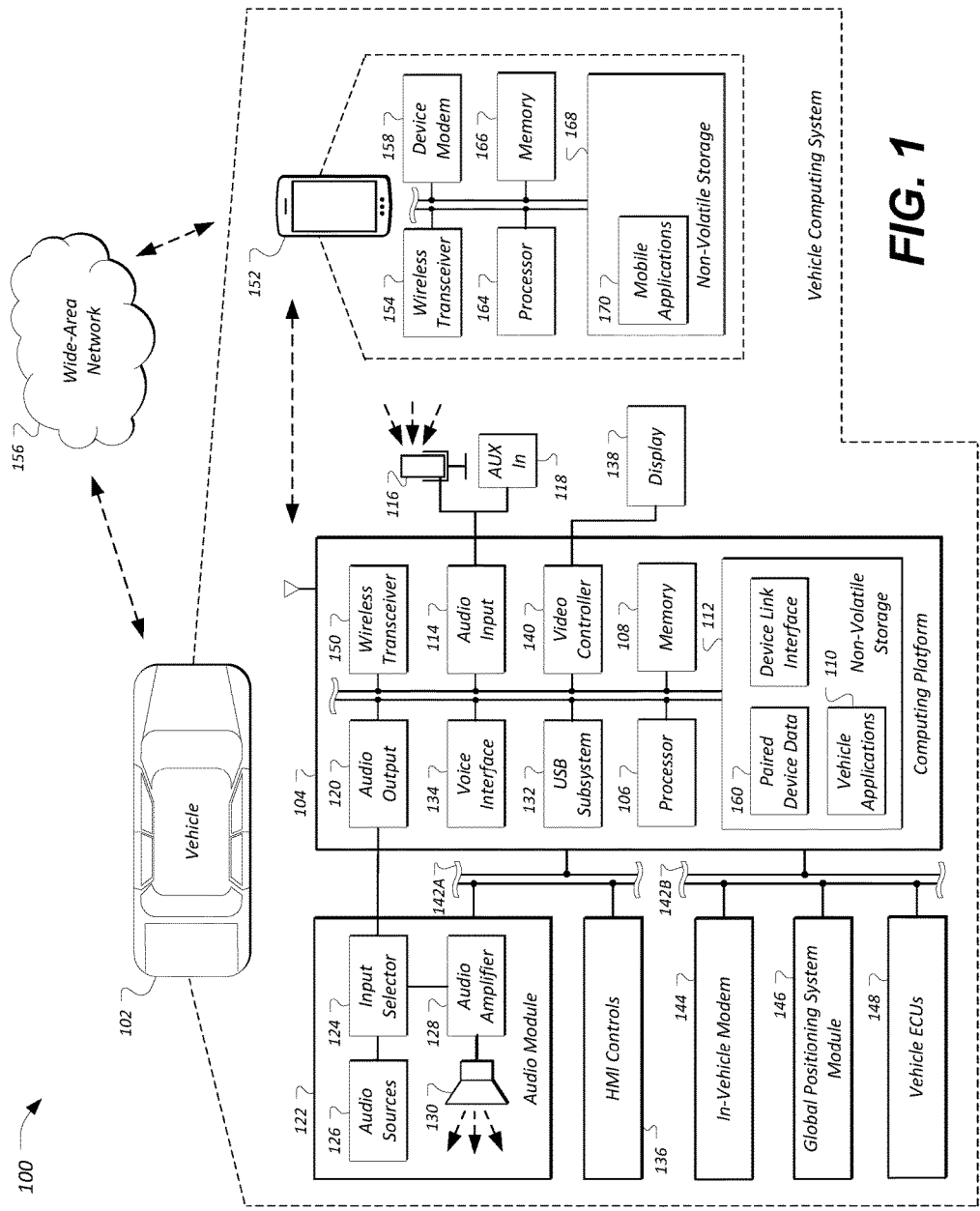
FIG. 1 illustrates an example diagram of a system that may be used to provide telematics services to a vehicle.

FIG. 1 illustrates an example diagram of a system 100 that may be used to provide telematics services to a vehicle 102. The vehicle 102 may include various types of passenger vehicle, such as crossover utility vehicle (CUV), sport utility vehicle (SUV), truck, recreational vehicle (RV), boat, plane or other mobile machine for transporting people or goods. Telematics services may include, as some non-limiting possibilities, navigation, turn-by-turn directions, vehicle health reports, local business search, accident reporting, and hands-free calling. In an example, the system 100 may include the SYNC system manufactured by The Ford Motor Company of Dearborn, Mich. It should be noted that the illustrated system 100 is merely an example, and more, fewer, and/or differently located elements may be used.

The computing platform 104 may include one or more processors 106 connected with both a memory 108 and a computer-readable storage medium 112 and configured to perform instructions, commands and other routines in support of the processes described herein. For instance, the computing platform 104 may be configured to execute instructions of vehicle applications 110 to provide features such as navigation, accident reporting, satellite radio decoding, and hands-free calling. Such instructions and other data may be maintained in a non-volatile manner using a variety of types of computer-readable storage medium 112. The computer-readable medium 112 (also referred to as a processor-readable medium or storage) includes any non-transitory (e.g., tangible) medium that participates in providing instructions or other data that may be read by the processor 106 of the computing platform 104. Computer-executable instructions may be compiled or interpreted from computer programs created using a variety of programming languages and/or technologies, including, without limitation, and either alone or in combination, Java, C, C++, C#, Objective C, Fortran, Pascal, Java Script, Python, Perl, and PL/SQL.

The computing platform 104 may be provided with various features allowing the vehicle occupants to interface with the computing platform 104. For example, the computing platform 104 may include an audio input 114 configured to receive spoken commands from vehicle occupants through a connected microphone 116, and auxiliary audio input 118 configured to receive audio signals from connected devices. The auxiliary audio input 118 may be a wired jack, such as a stereo input, or a wireless input, such as a BLUETOOTH audio connection. In some examples, the audio input 114 may be configure to provide audio processing capabilities, such as pre-amplification of low-level signals, and conversion of analog inputs into digital data for processing by the processor 106.

The computing platform 104 may also provide one or more audio outputs 120 to an input of the audio playback functionality of the audio module 122. In other examples, the computing platform 104 may provide audio output to the occupants through use of one or more dedicated speakers (not illustrated). The audio module 122 may include an input selector 124 configured to provide audio content from a selected audio source 126 to an audio amplifier 128 for playback through vehicle speakers 130. The audio sources 126 may include, as some examples, decoded amplitude modulated (AM) or frequency modulated (FM) radio signals, and compact disc (CD) or digital versatile disk (DVD) audio playback. The audio sources 126 may also include audio received from the computing platform 104, such as audio content generated by the computing platform 104, audio content decoded from flash memory drives connected to a universal serial bus (USB) subsystem 132 of the computing platform 104, and audio content passed through the computing platform 104 from the auxiliary audio input 118.

The computing platform 104 may utilize a voice interface 134 to provide a hands-free interface to the computing platform 104. The voice interface 134 may support speech recognition from audio received via the microphone 116 according to a grammar of available commands, and voice prompt generation for output via the audio module 122. In some cases, the system may be configured to temporarily mute, fade, or otherwise override the audio source specified by the input selector 124 when an audio prompt is ready for presentation by the computing platform 104 and another audio source 126 is selected for playback.

The computing platform 104 may also receive input from human-machine interface (HMI) controls 136 configured to provide for occupant interaction with the vehicle 102. For instance, the computing platform 104 may interface with one or more buttons or other HMI controls configured to invoke computing platform 104 functions (e.g., steering wheel audio buttons, a push-to-talk button, instrument panel controls, etc.). The computing platform 104 may also drive or otherwise communicate with one or more displays 138 configured to provide visual output to vehicle occupants by way of a video controller 140. In some cases, the display 138 may be a touch screen further configured to receive user touch input via the video controller 140, while in other cases the display 138 may be a display only, without touch input capabilities.

The computing platform 104 may be further configured to communicate with other components of the vehicle 102 via one or more in-vehicle networks 142. The in-vehicle networks 142 may include one or more of a vehicle controller area network (CAN), an Ethernet network, and a media oriented system transfer (MOST), as some examples. The in-vehicle networks 142 may allow the computing platform 104 to communicate with other vehicle 102 systems, such as an vehicle modem 144 (which may not be present in some configurations), a global positioning system (GPS) module 146 configured to provide current vehicle 102 location and heading information, and various vehicle ECUs (Electronic Control Units) 148 configured to provide other types of information regarding the systems of the vehicle 102. As some non-limiting possibilities, the vehicle ECUs 148 may include a powertrain controller configured to provide control of engine operating components (e.g., idle control components, fuel delivery components, emissions control components, etc.) and monitoring of engine operating components (e.g., status of engine diagnostic codes); a body controller configured to manage various power control functions such as exterior lighting, interior lighting, keyless entry, remote start, and point of access status verification (e.g., closure status of the hood, doors and/or trunk of the vehicle 102); a radio transceiver configured to communicate with key fobs or other local vehicle 102 devices; and a climate control management controller configured to provide control and monitoring of heating and cooling system components (e.g., compressor clutch and blower fan control, temperature sensor information, etc.).

As shown, the audio module 122 and the HMI controls 136 may communicate with the computing platform 104 over a first in-vehicle network 142A, and the vehicle modem 144, GPS module 146, and vehicle ECUs 148 may communicate with the computing platform 104 over a second in-vehicle network 142B. In other examples, the computing platform 104 may be connected to more or fewer in-vehicle networks 142. Additionally or alternately, one or more HMI controls 136 or other components may be connected to the computing platform 104 via different in-vehicle networks 142 than shown, or directly without connection to an in-vehicle network 142.

The computing platform 104 may also be configured to communicate with mobile devices 152 of the vehicle occupants. The mobile devices 152 may be any of various types of portable computing device, such as cellular phones, tablet computers, smart watches, laptop computers, portable music players, or other devices capable of communication with the computing platform 104. In many examples, the computing platform 104 may include a wireless transceiver 150 (e.g., a BLUETOOTH module, a ZIGBEE transceiver, a Wi-Fi transceiver, etc.) configured to communicate with a compatible wireless transceiver 154 of the mobile device 152. Additionally or alternately, the computing platform 104 may communicate with the mobile device 152 over a wired connection, such as via a USB connection between the mobile device 152 and the USB subsystem 132.

The wide-area network 156 may provide communications services, such as packet-switched network services (e.g., Internet access, VoIP communication services), to devices connected to the wide-area network 156. An example of a wide-area network 156 may include a cellular telephone network. Mobile devices 152 may provide network connectivity to the wide-area network 156 via a device modem 158 of the mobile device 152. To facilitate the communications over the wide-area network 156, mobile devices 152 may be associated with unique device identifiers (e.g., mobile device numbers (MDNs), Internet protocol (IP) addresses, mobile station international subscriber directory numbers (MSISDNs), international mobile subscriber identity (IMSI), etc.) to identify the communications of the mobile devices 152 over the wide-area network 156. In some cases, occupants of the vehicle 102 or devices having permission to connect to the computing platform 104 may be identified by the computing platform 104 according to paired device data 160 maintained in the storage medium 112. The paired device data 160 may indicate, for example, the unique device identifiers of mobile devices 152 previously paired with the computing platform 104 of the vehicle 102, secret information shared between the paired device and the computing platform 104 such as link keys, and/or personal identification numbers (PINs), and most recently used or device priority information, such that the computing platform 104 may automatically reconnect to the mobile devices 152 matching data in the paired device data 160 without user intervention. In some cases, the paired device data 160 may also indicate additional or options related to the permissions or functionality of the computing platform 104 that the paired mobile device 152 is authorized to access when connected.

When a paired mobile device 152 that supports network connectivity is automatically or manually connected to the computing platform 104, the mobile device 152 may allow the computing platform 104 to use the network connectivity of the device modem 158 to communicate over the wide-area network 156. In one example, the computing platform 104 may utilize a data-over-voice connection over a voice call or a data connection of the mobile device 152 to communicate information between the computing platform 104 and the wide-area network 156. Additionally or alternately, the computing platform 104 may utilize the vehicle modem 144 to communicate information between the computing platform 104 and the wide-area network 156, without use of the communications facilities of the mobile device 152.

Similar to the computing platform 104, the mobile device 152 may include one or more processors 164 configured to execute instructions of mobile applications 170 loaded to a memory 166 of the mobile device 152 from storage medium 168 of the mobile device 152. In some examples, the mobile applications 170 may be configured to communicate with the computing platform 104 or other locally-networked devices and with the wide-area network 156.

Figure 2:
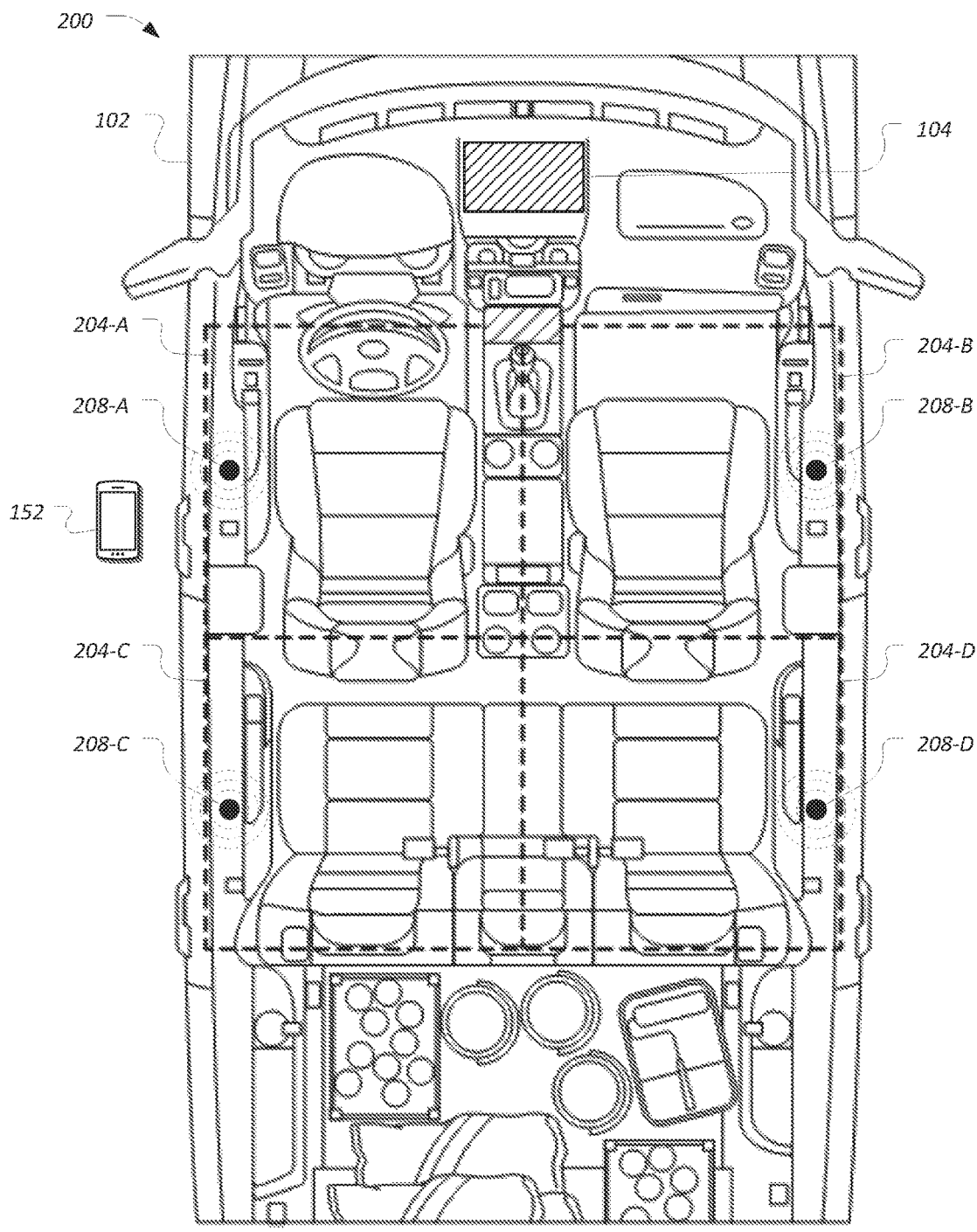
FIG. 2 illustrates an example diagram of the system illustrating the vehicle having an array of wireless sensors for use in assigning mobile devices to seating zones.

FIG. 2 illustrates an example diagram 200 of the system 100 illustrating the vehicle 102 having an array of wireless sensors 208-A through 208-D (collectively 208) for use in assigning mobile devices 152 to seating zones 204-A through 204-D (collectively 204). The assignment of mobile devices 152 to seating zones 204 may be performed by the mobile devices 152 or the computing platform 104 based on data about the signal strength between the mobile devices 152 and the wireless sensors 208. The assignment of mobile devices 152 to seating zones 204 may be used, in an example, to determine which features of the computing platform 104 are applicable to the location of the mobile devices 152. It should be noted that the illustrated system 100 is merely an example, and more, fewer, and/or differently located elements may be used. For examples, different vehicles 102 may include more, fewer, or differently-arranged seating zones 204 and/or wireless sensors 208.

The vehicle 102 interior may be divided into multiple zones 204, where each seating zone 204 may be associated with a seating position within the vehicle 102 interior. For instance, the front row of the illustrated vehicle 102 may include a first zone 204-A associated with the driver seating position, and a second zone 204-B associated with a front passenger seating position. The second row of the illustrated vehicle 102 may include a third zone 204-C associated with a driver-side rear seating position and a fourth zone 204-D associated with a passenger-side rear seating position.

The wireless sensors 208 may include various types of wireless transceivers configured to communicate wirelessly with the mobile devices 152. In an example, the wireless sensors 208 may include one or more of a BLUETOOTH module, a ZIGBEE transceiver, a Wi-Fi transceiver, an IrDA transceiver, an RFID transceiver, etc. configured to communicate with compatible wireless transceivers 154 of the mobile devices 152.

The wireless sensors 208 in the vehicle 102 may support BLE or another wireless technology that can provide distance or signal measurements between the mobile devices 152 and the wireless sensor 208. As a more specific example, the mobile devices 152 may communicate with wireless sensors 208 supporting BLE to capture received signal strength indication (RSSI) information provided by BLE protocol. In such a BLE example, the wireless sensors 208 of the vehicle 102 may advertise as BLE Peripherals, and the mobile device 152 may scan for BLE Peripherals as a BLE Central.

In some examples, the wireless transceiver 150 of the computing platform 104 may allow the computing platform 104 to communicate with the wireless sensors 208. For instance, the computing platform 104 may communicate with the wireless sensors 208 to receive the signal strength information between the wireless sensors 208 and the mobile devices 152. As another possibility, the computing platform 104 may communicate with the wireless sensors 208 over wired connections. For instance, the computing platform 104 may communicate with the wireless sensors 208 over wired universal serial bus (USB) connections connecting the computing platform 104 to the wireless sensors 208.

The wireless sensors 208 may be configured to provide signal strength information to indicate a stronger signal as the mobile device 152 approaches the wireless sensor 208, and a weaker signal as the mobile device 152 departs from the wireless sensor 208. As another possibility, the wireless sensors 208 may be configured to provide distance information indicating a measure of the distance between the wireless sensor 208 and the mobile devices 152 that becomes smaller as the mobile devices 152 approaches the wireless sensor 208, and that becomes greater as the mobile device 152 departs from the wireless sensor 208. Triangulation or other techniques may then be used to locate the mobile device 152 within the vehicle using the signal strength or distance information of connections between the mobile device 152 and each of the array of wireless sensors 208.

The wireless sensors 208 may be arranged within each of the doors of the vehicle 102. In the illustrated example, the wireless sensor 208-A is included in the front driver-side door, the wireless sensor 208-C is included in a second-row or rear driver-side door, the wireless sensor 208-B is included in the front passenger-side door, and the wireless sensor 208-D is included in a second-row or rear passenger-side door.

Variations on the number and arrangement of zones 204 are possible. For instance, an alternate second row may include an additional fifth zone 204-E of a second-row middle seating position (not shown). Or, a vehicle 102 having a third row may have an additional fifth zone 204-E behind the third zone 204-C and an additional sixth zone 204-F behind the fourth zone 204-D (not shown). It should be noted that differences in the zones 204 may affect the arrangement of wireless sensors 208. For instance, a vehicle 102 having additional rows of doors may require additional wireless sensors 208 within the additional doors.

Figure 3:
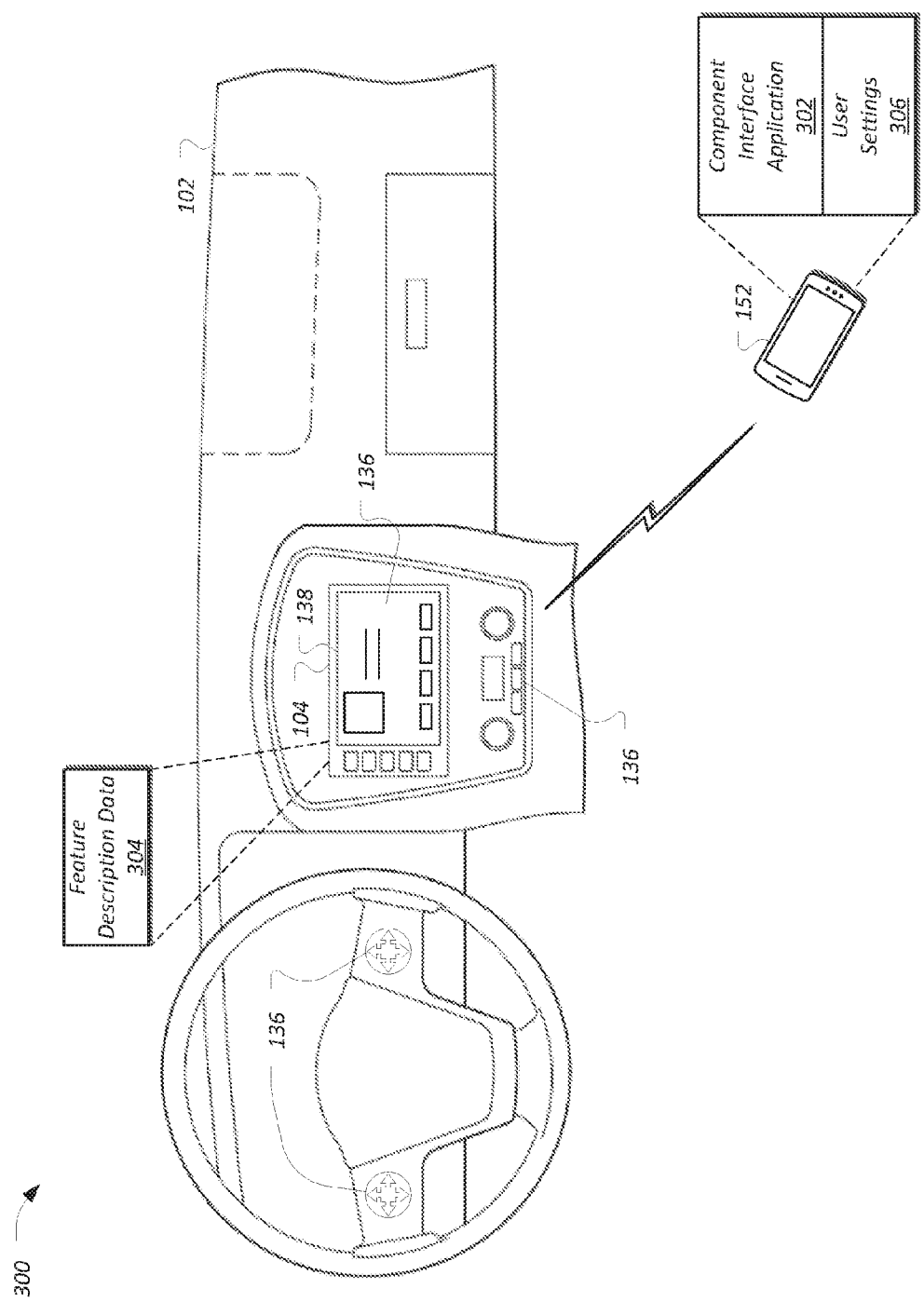
FIG. 3 illustrates an example diagram of a portion of the vehicle maintaining feature description data and a component interface application installed to a mobile device.

FIG. 3 illustrates an example diagram 300 of a portion of the vehicle 102 maintaining feature description data 304 and a component interface application 302 installed to a mobile device 152. The computing platform 104 may be configured to control various features of the vehicle 102 having user-configurable settings. These features may include, as some examples, overhead lights, climate controls, seat controls, and speakers. In many cases, the features may expose HMI controls 136 such as buttons, sliders, and touchscreens that may be used by the user to directly configure the particular settings of the in-vehicle component. Example HMI controls 136 are illustrated in the diagram 300. The computing platform 104 may receive input from the HMI controls 136 to provide for occupant interaction with the features of the vehicle 102. As some possibilities, the HMI controls 136 of the features may allow the user to manually set a lighting level of a light control, set a temperature of a climate control, set a volume and source of audio for a speaker, and set a position of a seat.

The component interface application 302 may be a mobile application 170 installed to a memory or other storage 168 of the mobile device 152. The component interface application 302 may be configured to facilitate vehicle occupant access to features of the vehicle 102 exposed for networked configuration via the computing platform 104. This access may be performed automatically using the component interface application 302, responsive to a determination that the mobile device 152 of a user has entered a seating zone 204 of the vehicle. In another example, the access may be performed in response to user input to the mobile device 152, regardless of whether user may be able to reach the HMI controls 136 for the feature.

The component interface application 302 may be configured to display a user interface descriptive of the available features, receive user input, and provide commands based on the user input to allow the user to control the features. Additionally or alternately, the component interface application 302 may be configured to automatically apply user settings 306 to the features of the zone 204 of the vehicle 102 in which the mobile device 152 of the user is located.

The user settings 306 may be indicative of user preferences for vehicle features, and may be stored to the storage 168 of the mobile device 152. In an example, the user settings 306 may include seat preferences (e.g., heated seats on, lumbar support settings, etc.), lighting preferences (e.g., a preferred color of ambient lighting, a preferred intensity of lighting, etc.), radio preferences (e.g., equalization settings, preferred stations or genres of music, preferred volume settings, etc.), and/or climate control preferences (e.g., a preferred temperature, whether air conditioning should be engaged, etc.). The component interface application 302 may apply the user settings 306 to the features of the vehicle 102 based on what features are available.

Each of the various features present in the vehicle 102 interior may be associated with one or more of the zones 204. As some examples, the features may be associated with the zone 204 in which the respective feature includes HMI controls 136 and/or the one (or more) of the zones 204 that is controlled by the respective features. For instance, the light features accessible by the front passenger may be associated with the second zone 204-B, while the light features accessible by passenger-side rear may be associated with the fourth zone 204-D. The computing platform 104 may also drive or otherwise communicate with one or more displays 138 configured to provide visual output to vehicle occupants regarding the current status of the features.

The component interface application 302 may be configured to identify the available features and current settings of the identified features, and determine which of the available features are within proximity to the vehicle occupant (e.g., in the same zone 204 as the location of the mobile devices 152). To provide for the identification and remote control of the vehicle features, the component interface application 302 may request the computing platform 104 to send the feature description data 304 to the mobile device 152. The feature description data 304 may be used by the component interface application 302 to determine what functionality is available for control in the seating zone 204 in which the user is located. Once retrieved, the feature description data 304 may also be used by the component interface application 302 to specify commands to be sent to the computing platform 104 to request changes to the configuration of the features.

The feature description data 304 may provide a concise representation of the vehicle 102 features that may be used for the description and control of component functionality. For each component, the feature description data 304 specifies a type of the feature, in which zone 204 or zones 204 of the vehicle 102 the feature has HMI controls 136 for manual adjustment of the feature, and which zone 204 or zones 204 of the vehicle 102 are affected by the functionality of the component. (It should be noted that having HMI controls 136 is not a requirement for a feature, and some features of zones 204 may be exposed for remote control without having corresponding HMI controls 136.) For many vehicles 102, the feature description data 304 may include a plurality of records for the various features of the vehicle 102, such as audio, climate control, and seat adjustment features. The feature description data 304 of the vehicle may be persisted on the vehicle 102, such as within the storage 112. Examples of the feature description data 304 are discussed in greater detail with respect to FIGS. 4A-4C.

Figure 4A:
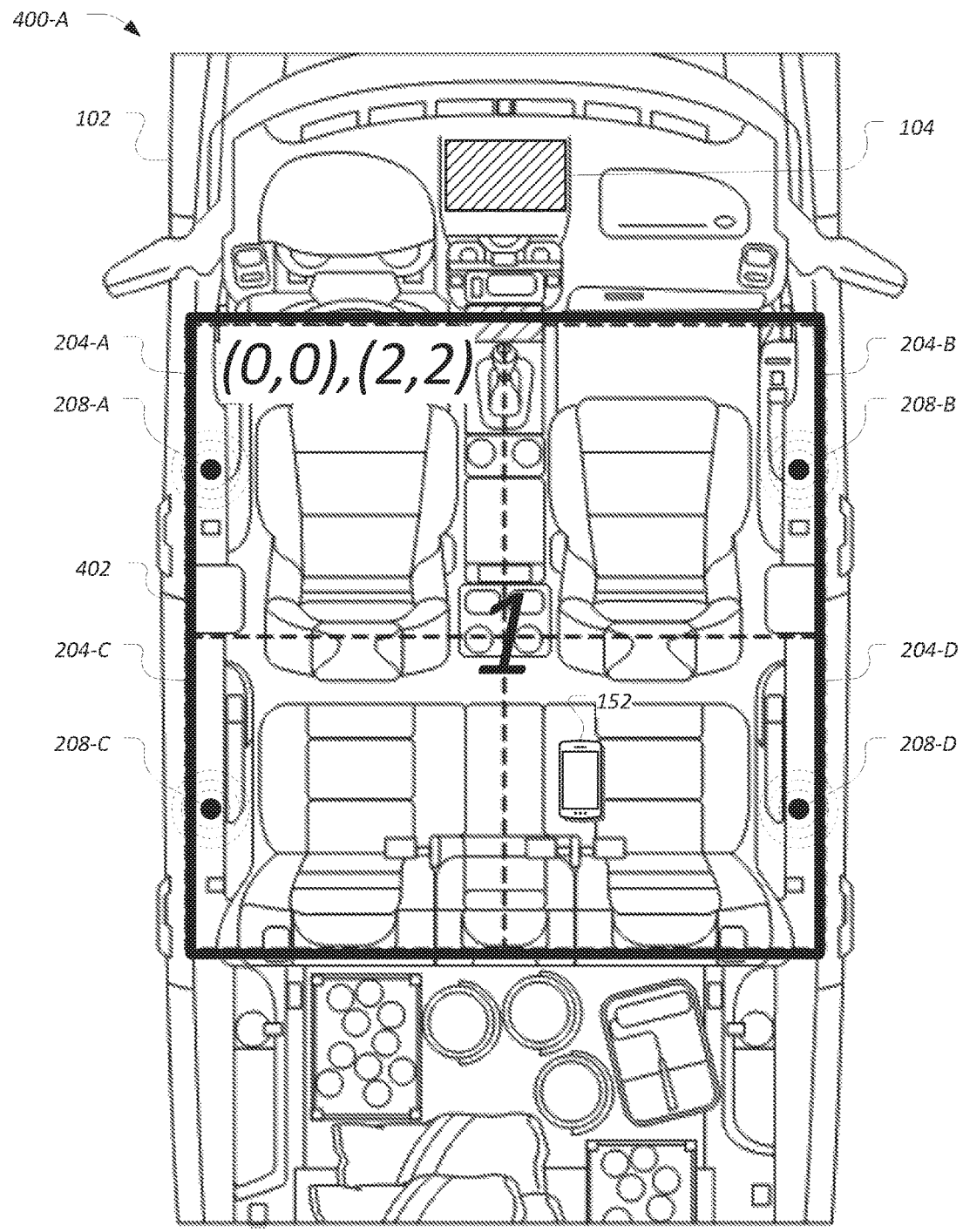
FIG. 4A illustrates an example diagram including a representation of a vehicle feature affecting all seating zones of the vehicle.

FIG. 4A illustrates an example diagram 400-A including a representation 402 of a vehicle 102 feature affecting all seating zones 204 of the vehicle 102. In an example, a representation 402 may be applicable to a radio feature of the audio module 122 configured to provide audio output to speakers 130 throughout the vehicle 102 cabin.

The feature description data 304 may specify the name or type of feature, as well as the affected seating zones 204 for the feature. The affected seating zones 204 may be specified as: (i) coordinates of a base seating zone 204 and (ii) a span or extent from the base coordinates specifying additional zones 204 contiguous to the base seating zone 204 also affected by the feature. In a two-dimensional feature representation, the coordinates of the base may be specified as a two-dimensional point by a pair of numerical distances from a fixed origin zone 204. In the vehicle context, these two dimensions may be referred to as row (e.g., front row, second row, etc.) and column (e.g., first seat in a row, second seat in a row, etc.). The span may then be represented by an extent in each of the dimensions (e.g., row and column) in a direction away from the origin zone 204. In many examples, the origin zone 204 is the driver zone 204-A, but other examples are possible.

In a three-dimensional feature representation, the coordinates of the base may be specified as a three-dimensional point by a triple (e.g., an n-tuple where n=3) of numerical distances from the fixed origin zone 204. These three dimensions may be referred to as row, column, and level. Three-dimensional representations may be useful for double-decker buses, boats, or other vehicles 102 having multiple levels of seating.

As shown in the example diagram 400-A, the coordinates of the base seating zone 204 are (0, 0), and the span from the base coordinates is (2, 2). Thus, the affected seating zones 204 for the illustrated feature cover all four seating zones 204 of the example vehicle 102.

JavaScript object notation (JSON) may be used as an example format to express the feature description data 304. In such an example, the four zones 204 affected by a feature of type RADIO may be represented in feature description data 304 as follows:

{"interiorZone": { "row": 0, "col": 0, "level": 0, "rowSpan": 2, "colSpan": 2, "levelSpan": 1}, "moduleType": "RADIO"}

With reference to the affected zones 204, the representation indicates three-dimensional coordinates for the zones 204, as well as that the origin row, column, and level are each zero (i.e., the driver seating zone 204-A). The representation further indicates the extent of the zone 204 as having a row span of two (spanning two zones), a column span of two (spanning two zones), and a level span of one (spanning one zone).

The placement of the feature within the vehicle 102 may also be represented by the feature description data 304. An example representation of the radio placement within the vehicle 102 as in the center stack may be encoded as follows:

{"interiorZone": { "row": 0, "col": 0, "level": 0, "rowSpan": 2, "colSpan": 1, "levelSpan": 1}, "moduleType": "RADIO"}

As shown in this representation, the feature being represented is again type RADIO, and is defined as being in the front seating zones 204 but not in the rear seating zones 204.

Figure 4B:
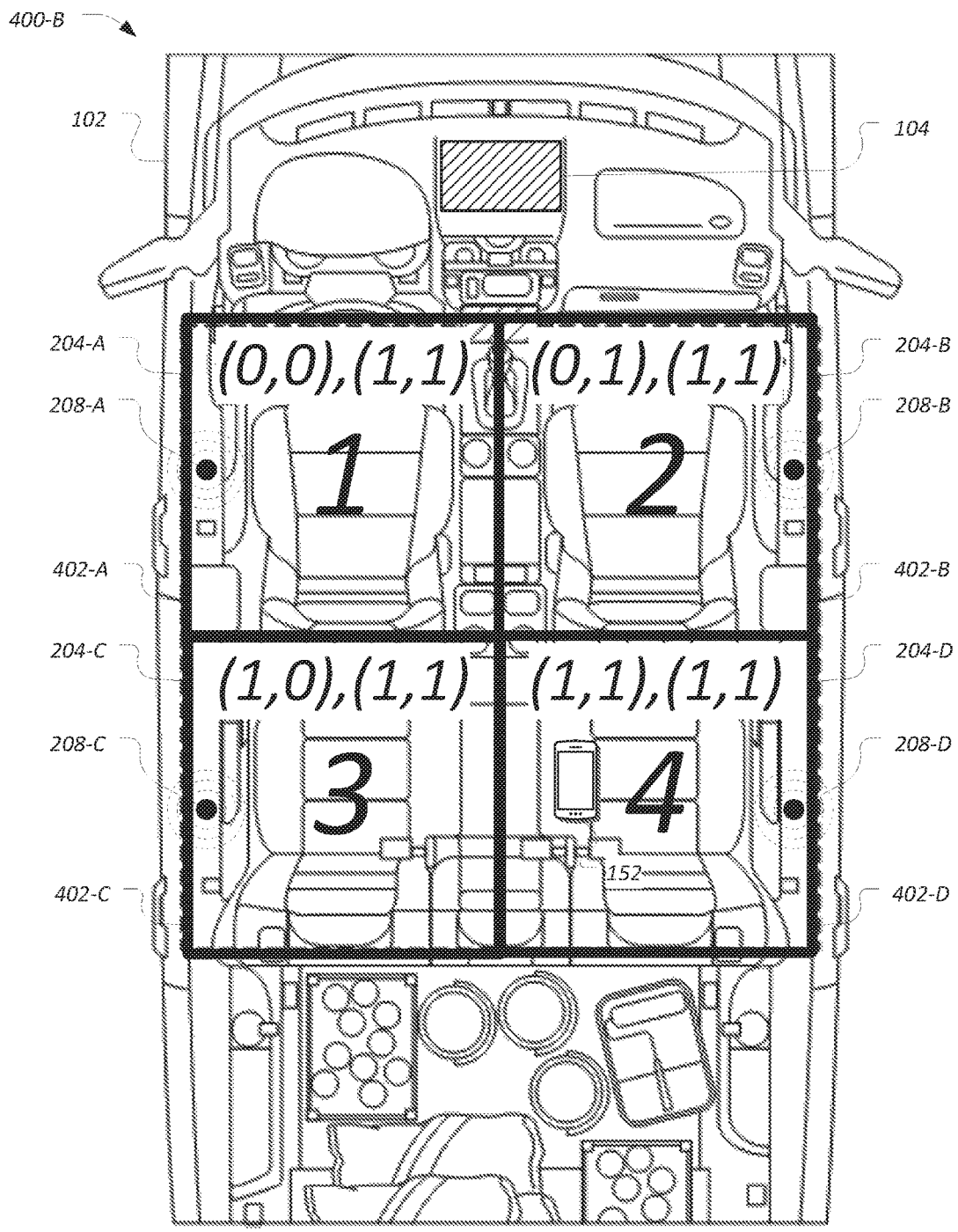
FIG. 4B illustrates an example diagram including representations of vehicle features affecting individual seating zones of the vehicle.

FIG. 4B illustrates an example diagram 400-B including representations 402-A through 402-D of vehicle 102 features affecting individual seating zones 204 of the vehicle 102. In an example, each of the representations 402-A through 402-D may be applicable to a seat feature or a light feature of a corresponding seating zone 204-A through 204-D of the vehicle 102, where each features only affects a single zone 204.

In such an example, the feature description data 304 for the affected zones 204 for the features may be specified as follows:

{"interiorZone": { "row": 0, "col": 0, "level": 0, "rowSpan": 1, "colSpan": 1, "levelSpan": 1}, "moduleType": "SEAT"}

{"interiorZone": { "row": 0, "col": 1, "level": 0, "rowSpan": 1, "colSpan": 1, "levelSpan": 1}, "moduleType": "SEAT"}

{"interiorZone": { "row": 1, "col": 0, "level": 0, "rowSpan": 1, "colSpan": 1, "levelSpan": 1}, "moduleType": "SEAT"}

{"interiorZone": { "row": 1, "col": 1, "level": 0, "rowSpan": 1, "colSpan": 1, "levelSpan": 1}, "moduleType": "SEAT"}

Additionally, as each feature may be controlled within its respective zone 204, the feature description data 304 for the placement of the feature controls may also be specified as follows:

{"interiorZone": { "row": 0, "col": 0, "level": 0, "rowSpan": 1, "colSpan": 1, "levelSpan": 1}, "moduleType": "SEAT"}

{"interiorZone": { "row": 0, "col": 1, "level": 0, "rowSpan": 1, "colSpan": 1, "levelSpan": 1}, "moduleType": "SEAT"}

{"interiorZone": { "row": 1, "col": 0, "level": 0, "rowSpan": 1, "colSpan": 1, "levelSpan": 1}, "moduleType": "SEAT"}

{"interiorZone": { "row": 1, "col": 1, "level": 0, "rowSpan": 1, "colSpan": 1, "levelSpan": 1}, "moduleType": "SEAT"}

Figure 4C:
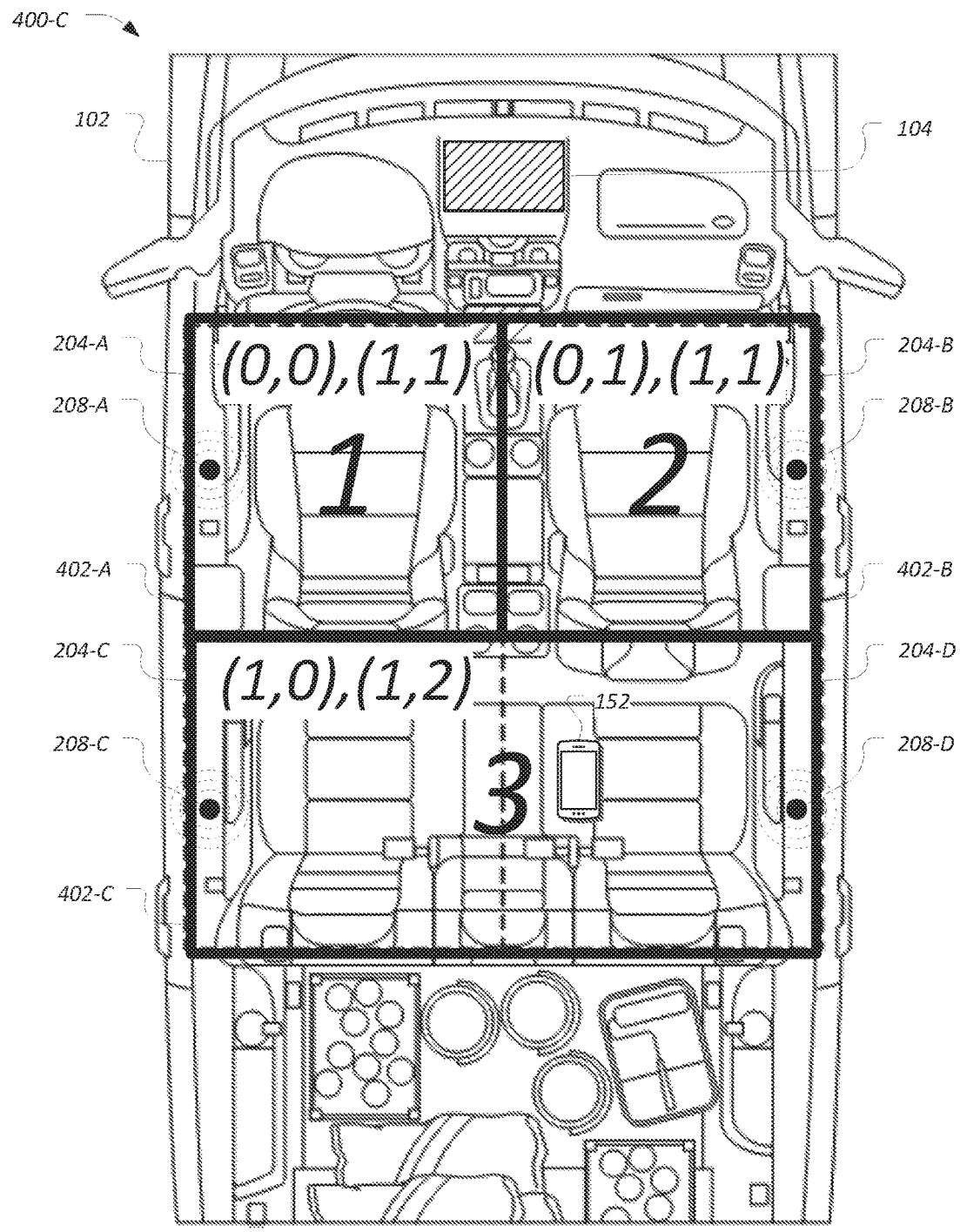
FIG. 4C illustrates an example diagram including representations of vehicle features affecting individual and combined seating zones.

FIG. 4C illustrates an example diagram 400-C including representations 402-A through 402-C of vehicle 102 features affecting individual and combined seating zones 204 of the vehicle 102. In an example, each of the representations 402-A and 402-B may be applicable to a climate control feature of a corresponding seating zone 204-A and 204-B of the vehicle 102, while the representation 402-C may be applicable to a climate control zone climate control feature of a corresponding seating zones 204-C and 204-D. In such an example, the feature description data 304 for the affected zones 204 for the features may be specified as follows:

{"interiorZone": { "row": 0, "col": 0, "level": 0, "rowSpan": 1, "colSpan": 1, "levelSpan": 1}, "moduleType": "CLIMATE"}

{"interiorZone": { "row": 0, "col": 1, "level": 0, "rowSpan": 1, "colSpan": 1, "levelSpan": 1}, "moduleType": "CLIMATE"}

{"interiorZone": { "row": 1, "col": 0, "level": 0, "rowSpan": 1, "colSpan": 2, "levelSpan": 1}, "moduleType": "CLIMATE"}

Additionally, as each feature may be controlled within its respective zone 204, the feature description data 304 for the placement of the feature controls may also be specified as follows:

{"interiorZone": { "row": 0, "col": 0, "level": 0, "rowSpan": 1, "colSpan": 1, "levelSpan": 1}, "moduleType": "CLIMATE"}

{"interiorZone": { "row": 0, "col": 1, "level": 0, "rowSpan": 1, "colSpan": 1, "levelSpan": 1}, "moduleType": "CLIMATE"}

{"interiorZone": { "row": 1, "col": 0, "level": 0, "rowSpan": 1, "colSpan": 2, "levelSpan": 1}, "moduleType": "CLIMATE"}

Based on the location of the mobile device 152, a subset of the feature description data 304 may be generated that succinctly describes the available functions within the seating zone 204 of the mobile device 152. Thus, for an example vehicle 102 having radio, seat, light, and climate control features, the feature description data 304 for the features applicable to the driver's seating zone 204 may be specified as follows:

{"interiorZone": { "row": 0, "col": 0, "level": 0, "rowSpan": 2, "colSpan": 2, "levelSpan": 1}, "moduleType": "RADIO"}

{"interiorZone": { "row": 0, "col": 0, "level": 0, "rowSpan": 1, "colSpan": 1, "levelSpan": 1}, "moduleType": "SEAT"}

{"interiorZone": { "row": 0, "col": 0, "level": 0, "rowSpan": 1, "colSpan": 1, "levelSpan": 1}, "moduleType": "LIGHT"}

{"interiorZone": { "row": 0, "col": 0, "level": 0, "rowSpan": 1, "colSpan": 1, "levelSpan": 1}, "moduleType": "CLIMATE"}

As a more detailed example, a passenger of the vehicle 102 (e.g., in the seating zone 204-C behind the driver) may have the component interface application 302 installed to his or her mobile device 152. When the passenger enters the vehicle, the mobile device 152 may utilize signal strength data from the array of wireless sensors 208 to determine a seating zone 204 for the mobile device 152 (e.g., the seating zone 204-C in this example). For instance, the component interface application 302 may receive the signal strength data, and determine that the signal strength to the wireless sensor 208-C is strongest among the strengths between the mobile device 152 and the array of wireless sensors 208.

The component interface application 302 installed to the user's mobile device 152 may request the computing platform 104 to send the feature description data 304 applicable to the device's zone 204 to the mobile device 152. Or, the component interface application 302 may receive the applicable feature description data 304 as a broadcast from the wireless sensor 208-C of the device's zone 204. For example, the applicable feature description data 304 broadcast by the wireless sensor 208-C may be as follows:

{"interiorZone": { "row": 1, "col": 0, "level": 0, "rowSpan": 1, "colSpan": 1, "levelSpan": 1}, "moduleType": "SEAT"}

{"interiorZone": { "row": 1, "col": 0, "level": 0, "rowSpan": 1, "colSpan": 1, "levelSpan": 1}, "moduleType": "LIGHT"}

{"interiorZone": { "row": 1, "col": 0, "level": 0, "rowSpan": 1, "colSpan": 2, "levelSpan": 1}, "moduleType": "CLIMATE"}

The feature description data 304 may be used by the component interface application 302 to determine what functionality is available for control in the seating zone 204 in which the user is located.

The feature description data 304 may be used by the component interface application 302 to specify commands to be sent to the computing platform 104 to request changes to the configuration of the features. In an example, the component interface application 302 may compare the available features to the user settings 306 of the user stored to the mobile device 152. For those features that have associated user settings 306, and the component interface application 302 may send one or more requests to the computing platform 104 to configure the functions available in the seating zone 204 of the mobile device 152 in accordance with the user settings 306. Continuing with the example of the user in the seating zone 204-C, the component interface application 302 may communicate the location of a SEAT function to be adjusted using a description as follows:

{"interiorZone": { "row": 1, "col": 0, "level": 0, "rowSpan": 1, "colSpan": 1, "levelSpan": 1}, "moduleType": "SEAT"}

Responsive to receipt of the request(s), the computing platform 104 may adjust the feature settings for the zone 204 of the user. In some examples, the computing platform 104 may request permission from the driver to allow that passenger to control the feature (e.g., a confirmation message in the display 138, an audio prompt via the vehicle speakers 130, etc.).

Thus, by using the component interface application 302 and the feature description data 304, the mobile device 152 may be able to automatically apply user settings 306 stored to the mobile device 152 for the automatic configuration of vehicle 102 features.

Figure 4D:
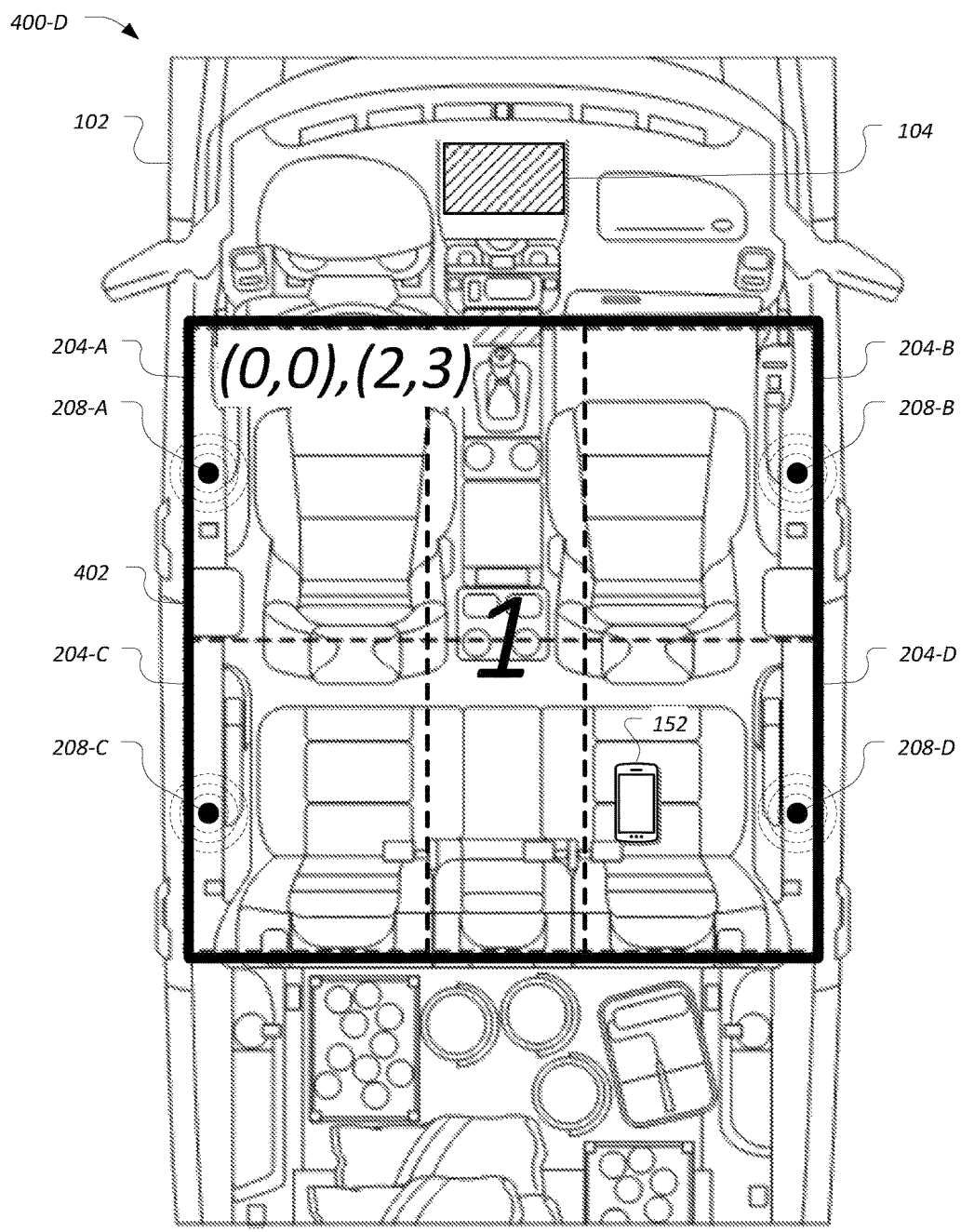
FIG. 4D illustrates an example diagram including an alternate representation of a vehicle feature affecting all seating zones of the vehicle.

FIG. 4D illustrates an example diagram 400-D including an alternate representation 402 of a vehicle 102 feature affecting all seating zones 204 of the vehicle 102. As compared to the diagram 400-A, the vehicle 102 in the diagram 400-D has three seating zones 204 across rather than two. In such an example, the zones 204 affected by a "radio" feature may be represented in feature description data 304 as follows:

{"interiorZone": { "row": 0, "col": 0, "level": 0, "rowSpan": 2, "colSpan": 3, "levelSpan": 1}, "moduleType": "RADIO"}

The placement of the feature within the vehicle 102 may also be represented as follows to indicate the central placement of the feature controls within the center stack:

{"interiorZone": { "row": 0, "col": 1, "level": 0, "rowSpan": 1, "colSpan": 1, "levelSpan": 1}, "moduleType": "RADIO"}

Figure 5:
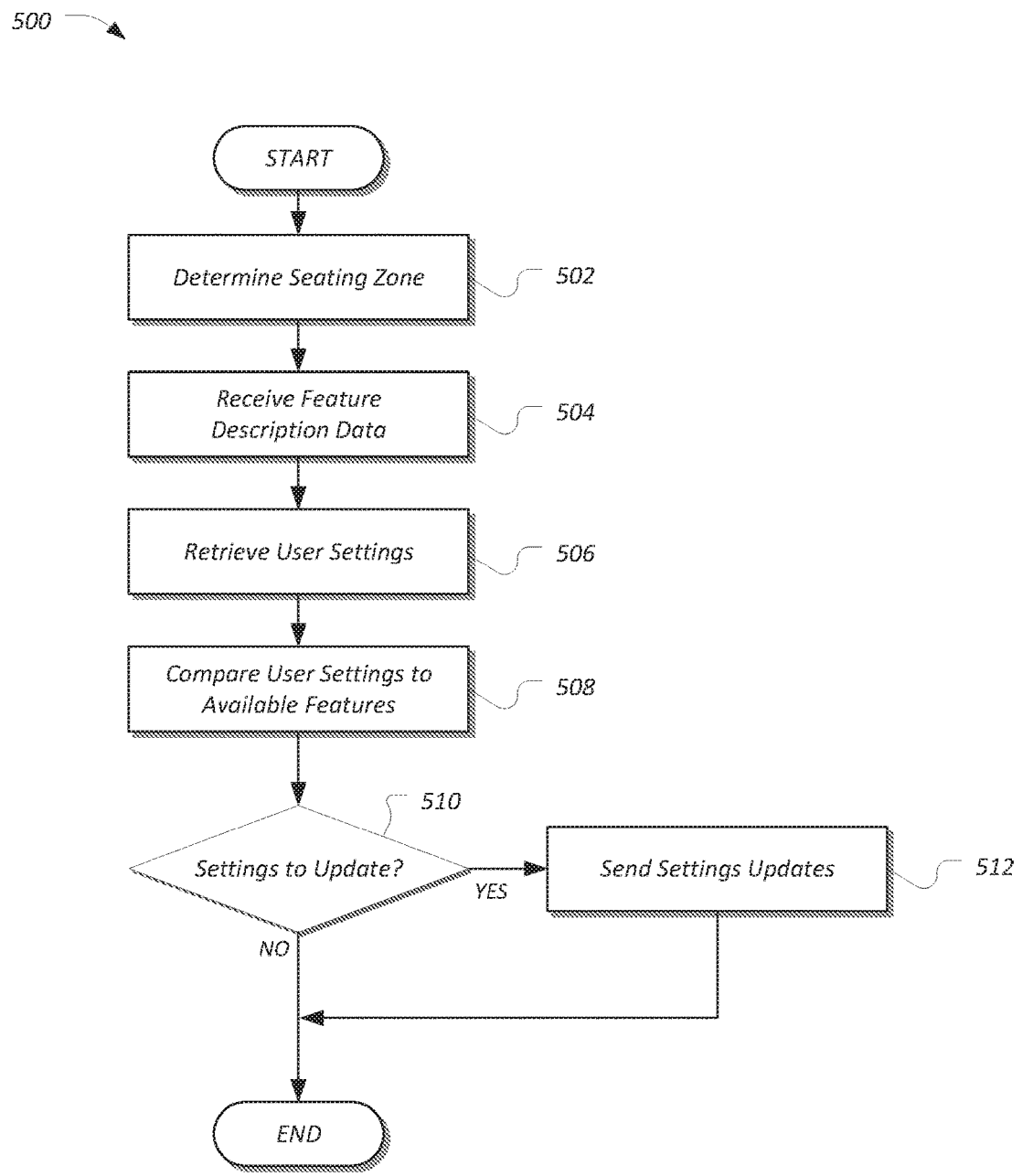
FIG. 5 illustrates an example process for the use of the feature description data by the component interface application for controlling vehicle features.

FIG. 5 illustrates an example of a process 500 for the use of the feature description data 304 by the component interface application 302 for the configuration of vehicle features. In an example, the process 500 may be performed by the mobile device 152 in communication with the computing platform 104.

At operation 502, the mobile device 152 determines a seating zone 204 in which the mobile device 152 is located. In an example, the component interface application 302 installed to the mobile device 152 may receive the signal strength data from the wireless transceiver 154 of the mobile device 152. In a BLE example, the wireless sensors 208 of the vehicle 102 may advertise as BLE Peripherals, and the component interface application 302 may direct the mobile device 152 to scan for BLE Peripherals as a BLE Central. The received data may indicate signal strength and/or distance information between the mobile device 152 and some or all of the array of wireless sensors 208. Using the received data, the component interface application 302 may determine which wireless sensor 208 is closest to the mobile device 152, and may assign the mobile device 152 to the seating zone 204 of the vehicle 102 closest to the closest wireless sensor 208.

As a variation to operation 502, the computing platform 104 may perform the determination of the seating zone 204 of the mobile device 152 using the data from the wireless sensors 208, and may use the wireless transceiver 150 to provide the indication of the seating zone 204 in which the mobile device 152 is located to the component interface application 302.

At operation 504, the mobile device 152 receives the feature description data 304 from the computing platform 104 of the vehicle 102. In an example, the component interface application 302 sends a request to the computing platform 104 for the feature description data 304. The computing platform 104 may receive the request, access the feature description data 304 maintained in the storage 112 of the computing platform 104, and return a response to the component interface application 302 including the requested data. In another example, the feature description data 304 may be broadcast by the wireless sensors 208 and may be received by devices connected to the wireless sensors 208. For instance, the mobile device 152 may connect to the wireless sensor 208 in the seating zone 204 of the mobile device 152, and may receive from the wireless sensor 208 the feature description data 304 relevant to the current seating zone 204 of the mobile device 152. Examples of the feature description data 304 are described in detail above.

At 506, the mobile device 152 retrieves the user settings 306 for the user. In an example, the component interface application 302 accesses the storage 168 of the mobile device 152 to retrieve the user settings 306. In another example, the user settings 306 may be stored remote from the mobile device 152, and the component interface application 302 may utilize the device modem 158 to retrieve the user settings 306 from a remote server via the wide-area network 156.

At operation 508, the mobile device 152 compares the user settings 306 to the available features of the feature description data 304. The component interface application 302 may compare the user settings 306 with the feature description data 304 to determine which user settings 306 relate to features that are available within the seating zone 204 of the user. For instance, the user settings 306 may indicate function types and desired settings, and the entries of the feature description data 304 may indicate available function types. As one specific example, the user settings 306 may indicate desired seat settings, and the feature description data 304 may indicate that configurable seat functions are available. As another possibility, the user settings 306 may indicate desired climate control settings, and the feature description data 304 may indicate that configurable climate control functions are available.

At operation 510, the mobile device 152 determines whether to request updates to feature settings of the vehicle 102. In an example, if there are matching user settings 306 for the available functions defined in the feature description data 304, control passes to operation 512. Otherwise, the process 500 ends.

At operation 512, the mobile device 152 sends settings updates to the computing platform 104 of the vehicle 102. In an example, the component interface application 302 sends one or more requests to the computing platform 104 requesting that settings for the features of the seating zone 204 be adjusted in accordance with the user settings 306. In an example, the feature description data 304 may indicate that the seat includes a heated seat function, and the user settings 306 may indicate the user preference for the heated seat function to be engaged. Accordingly, the component interface application 302 may send a request to the computing platform 104 to activate heated seats in the seating zone 204 of the user of the mobile device 152. In another example, the feature description data 304 may indicate the availability of climate controls for the zone 204 of the user, and the user settings 306 may indicate the user preference for heat or air conditioning at a particular temperature. Accordingly, the component interface application 302 may send a request to the computing platform 104 to set the climate controls in the seating zone 204 of the user of the mobile device 152 to the indicated temperature. After operation 512, the process 500 ends.

Figure 6:
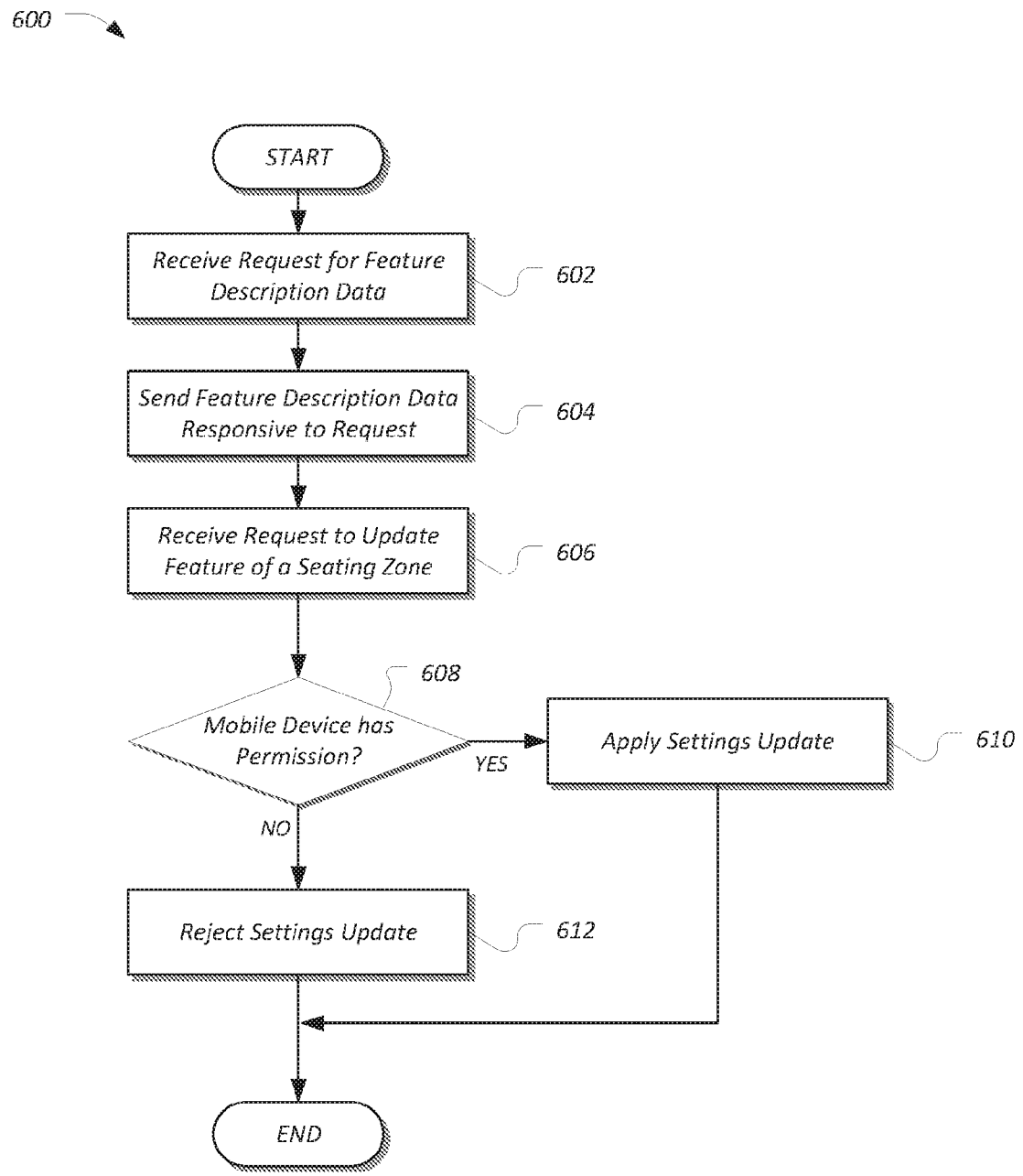
FIG. 6 illustrates an example process for the use of the feature description data by the computing platform for controlling vehicle features.

FIG. 6 illustrates an example of a process 600 for the use of the feature description data 304 by the computing platform 104 for the configuration of vehicle features. In an example, the process 600 may be performed by the computing platform 104 in communication with a mobile device 152.

At operation 602, the computing platform 104 receives a request from a mobile device 152 for the feature description data 304. In an example, the computing platform 104 receives the request from the component interface application 302 as discussed above with respect to operation 504 of the process 500. In other examples, the computing platform 104 may broadcast the feature description data 304 to mobile device 152 connected to the wireless sensors 208, without receiving a request to do so.

At operation 604, the computing platform 104 sends the feature description data 304 to the mobile device 152 responsive to the request. In an example, the computing platform 104 sends the feature description data 304 to the component interface application 302 as discussed above with respect to operation 506 of the process 500.

At 606, the computing platform 104 receives a settings update request to update a feature available within the seating zone 204 of the mobile device 152. In an example, the computing platform 104 receives the settings update request from the component interface application 302 as discussed above with respect to operation 512 of the process 500.

At operation 608, the computing platform 104 determines whether the mobile device 152 has permission to perform the settings update. In an example, the computing platform 104 may access the storage 112 to determine whether a unique identifier of the mobile device 152 is authorized for the vehicle 102 to make changes to the feature settings. If so, control passes to operation 610. Otherwise control passes to operation 612.

In another example of operation 608, the computing platform 104 may present a prompt in the vehicle 102 HMI requesting that the driver authorize the mobile device 152 for performing settings changes to the vehicle 102. If the driver authorizes the request, control passes to operation 610 where otherwise control passes to operation 612. The computing platform 104 may also apply to the storage 112 information indicative of the decision whether the mobile device 152 is authorized for use in handling future settings requests from the mobile device 152.

At operation 610, the computing platform 104 applies the settings update. In an example, the computing platform 104 may apply the settings update to the feature of the seating zone 204 consistent with updating the settings of the feature in response to manual input to the vehicle HMI controls 136. In contrast, at operation 612, the computing platform 104 rejects the settings update.

After operations 610 or 612, the process 600 ends. In other examples, control may pass from operation 610 and 612 to operation 606 to receive additional settings updates, or to operation 602 to receive additional requests for feature description data 304.

Variations on the system 100 are possible. For example, while many of the aforementioned examples relate to the vehicle 102 environment, the described feature description data 304 approach may be utilized for other physical spaces as well. More generally, a system 100 may split a home, business, parking garage, or other structure having physical space into zones 204. These zones 204 may include, for example, floors of the structure, rooms of the structure, parking lot areas, or other geographical areas of a physical space. Features of the physical spaces may accordingly be described by feature description data 304, such that coverage of which settable features affect what zones may be succinctly described.

In a non-vehicle setting, a user may install a configuration application to his or her mobile device 152. Wireless sensors 208 may be placed around the home or other physical structure to allow for location of the mobile device 152 within the space. A computing platform 104 may be installed to the structure (e.g., a home automation system) and configured to manage the features of the structure. The installed application may utilize a wireless connection to the computing platform 104 to request feature description data 304 for the structure and to use the feature description data 304 to request settings updates to be performed to the controlled structure.

In a more specific example, the mobile device 152 may be used to control the temperature settings in a home. As the user of the mobile device 152 moves out of communication range of one or more wireless sensors 208 on a first floor of the home and into communication range of one or more wireless sensors 208 on a second floor of the home, the mobile device 152 may receive a notification message from the wireless sensors 208 including feature description data 304 descriptive of available functions of the second floor of the home. The mobile device 152 receiving the feature description data 304 may accordingly be able to use the feature description data 304 to control the available features of the second floor of the home. For instance, a heating zone for the second floor may be available, and the feature description data 304 may indicate the availability of the thermostat feature of the second floor (e.g., level 1) as follows:

{"interiorZone": { "row": 0, "col": 0, "level": 1, "rowSpan": 1, "colSpan": 1, "levelSpan": 1}, "moduleType": "THERMOSTAT"}

Computing devices described herein, such as the computing platform 104 and mobile devices 152, generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, C#, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

With regard to the processes, systems, methods, heuristics, etc., described herein, it should be understood that, although the steps of such processes, etc., have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
wireless sensors included within zones of a physical space;
memory storing feature description data; and
a processor, in communication with the memory and the wireless sensors, programmed to
send, to a mobile device connected to one of the wireless sensors, a subset of the feature description data applicable to one of the zones in which the mobile device is located, wherein the feature description data includes types of features and affected zones for the features, and the affected zones for the features are specified as a (i) base location tuple specifying distances for each dimension away from a fixed origin zone, and (ii) an extent for each dimension away from the fixed origin zone,
receive a request to update a feature of the one of the zones based on the feature description data, and
apply the update to the feature when the mobile device has permission to update the features.

2. The system of claim 1, wherein the processor is further programmed to determine that the mobile device has the permission by receiving confirmation through a human-machine interface to update the features.

3. The system of claim 1, wherein the zones of the physical space are seating zones of a vehicle, the wireless sensors are included within doors of the vehicle, and each door is associated with one of the seating zones.

4. The system of claim 1, wherein the zones of the physical space are rooms of a structure.

5. The system of claim 1, wherein the base location tuple is a three-dimensional coordinate and the extent for each dimension is a three-dimensional extent.

6. The system of claim 1, wherein the feature description data stored by the memory describes a plurality of climate control features, and the subset of the feature description data applicable to the one of the zones includes one of the plurality of climate control features controlling climate settings in the one of the zones.

7. A system comprising:
a mobile device including
a wireless transceiver; and
a processor programmed to
determine a seating zone of a vehicle in which a user of the mobile device is located using the wireless transceiver and wireless sensors of the vehicle, receive, from a vehicle computing platform, feature description data including types of features and affected zones for the features, where the affected zones for the features are specified as a (i) base location tuple specifying distances for each dimension away from a fixed origin zone, and (ii) an extent for each dimension away from the fixed origin zone, and request the platform to adjust the features applicable to the determined seating zone per user settings.

8. The system of claim 7, wherein the processor is further programmed to:

compare the user settings with the feature description data to determine which user settings include preferences for features that are available within the seating zone; and for the user settings that relate to the features that are available within the seating zone, adjust the features of the seating zone in accordance with the preferences.

9. The system of claim 7, wherein the user settings are stored to a memory of the mobile device.

10. The system of claim 7, wherein the features include climate controls, the user settings include a preferred temperature, and to adjust the features in accordance with the user settings includes setting the climate controls to the preferred temperature.

11. The system of claim 7, wherein the feature description data enumerates the types of the features and the affected seating zones for the features.

12. The system of claim 11, wherein the fixed origin zone is a driver seating zone.

13. The system of claim 12, wherein the feature description data further specifies seating zones of the vehicle in which controls for the features are located.

14. The system of claim 7, wherein the processor is further programmed to:

determine a second seating zone of the vehicle to which the mobile device is moved using the wireless sensors of the vehicle;

receive, from the computing platform, feature description data including types of features applicable to the second seating zone; and request the computing platform to adjust the features applicable to the second seating zone in accordance with the user settings.

15. A method comprising:

receiving, from a vehicle, feature description data enumerating types of vehicle features and affected zones for the features, the affected zones for a feature being specified as a multi-dimensional tuple of distances from a fixed origin seating zone and an extent in each distance tuple dimension away from the fixed origin seating zone; and controlling by the vehicle the features per user settings stored to a mobile device specifying feature preferences.

16. The method of claim 15, wherein the multi-dimensional tuple is a three-dimensional coordinate and the extent in each distance tuple dimension is a three-dimensional extent.

17. The method of claim 15, wherein the features include climate controls, the user settings include a preferred temperature, and further comprising adjusting the features in accordance with the user settings by setting the climate controls to the preferred temperature.

* * * * *